Sept. 10, 1929.    W. SCHLIE    1,727,522
SIGNAL LIGHT
Filed Jan. 14, 1924
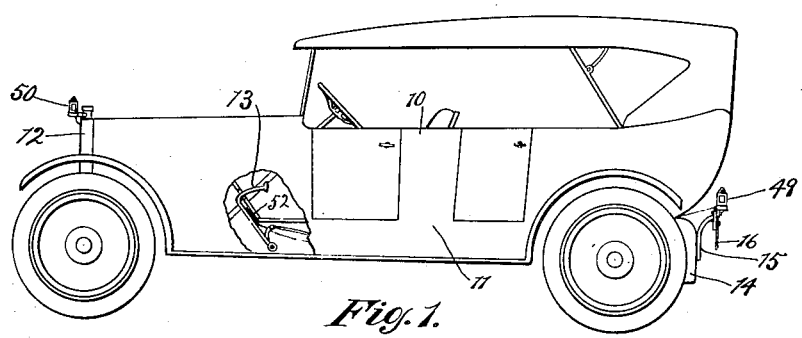
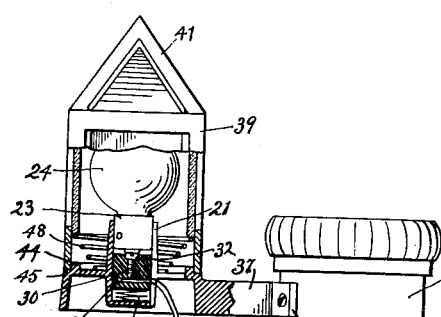
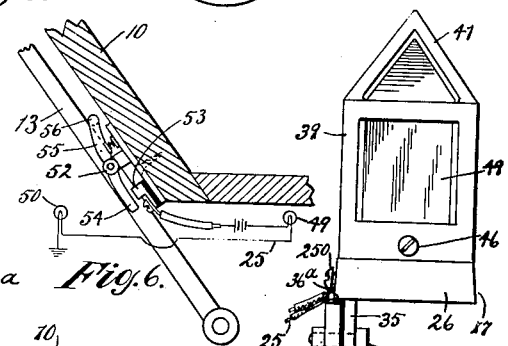
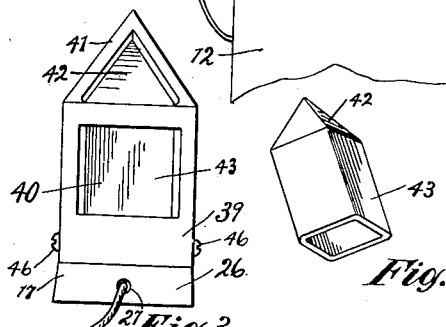
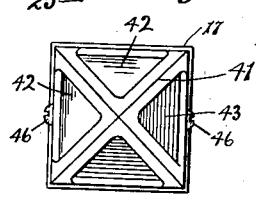
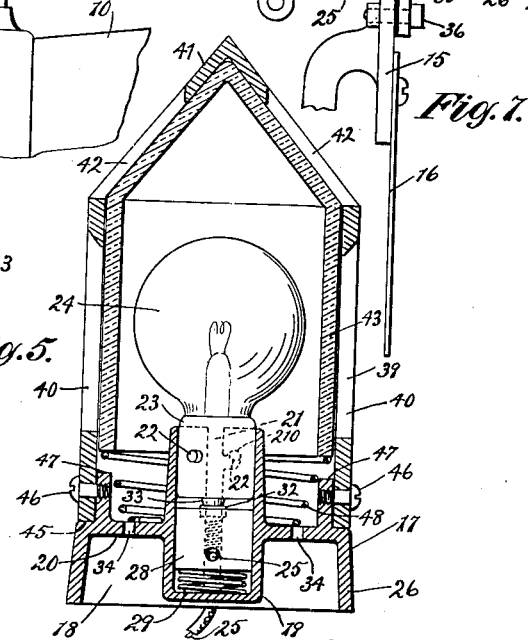
Inventor:
William Schlie
By
Attys Patented Sept. 10, 1929.

1,727,522

UNITED STATES PATENT OFFICE.

WILLIAM SCHLIE, OF CHICAGO, ILLINOIS.

SIGNAL LIGHT.

Application filed January 14, 1924. Serial No. 686,236.

This invention relates to signal devices, and one of the objects of the invention is the provision of a system of signal lights for indicating the movements of vehicles.

Another object of the invention is the provision of a new and improved protector and support for signal lights so constructed and arranged that the shades and shadows cast by said support on and within said protector will render the device when illuminated readily discernible in the daytime as well as at night.

Another object of the invention is the provision of a new and improved support and colored glass protector that is substantial in construction, highly ornamental in appearance and that extends about the top and sides of the light without obscuring the view of said light from any of these directions.

Still further objects of the invention are the provision of a new and improved base with means for detachably connecting the light-bulb, the protector and the support thereto together with means for preventing rattling of the parts.

A still further object of the invention is the provision of a new and improved arrangement of insulator member and connector mechanism for electric lights that are adapted for use on automobiles.

Other and further objects and advantages of the invention will appear from the following description taken in connection with the accompanying drawings, in which Fig. 1 is a side elevation of an automobile with the invention in position thereon and shown more or less diagrammatically, with parts broken away;

Fig. 2 is a vertical section of the signal light;

Fig. 3 is a side elevation of the signal light;

Fig. 4 is a plan view of the same;

Fig. 5 is a perspective view of the protector member;

Fig. 6 is a detail view showing the electric switch and a wiring diagram for the lights;

Fig. 7 is a side elevation of the signal light showing a modified form of attaching means; and Fig. 8 is a side elevation of a portion of the front of an automobile showing the signal light attached thereto, with a still further modified form of attaching means.

On the drawing the reference character 10 designates an automobile of any usual or well known construction which comprises the body 11, radiator 12, and control pedal or lever 13. A fuel tank 14 is mounted at the rear of the body and is adapted to have secured thereto a bracket 15 for supporting the license tag 16 and tire carrier, not shown.

Numerous accidents have occurred at the intersections of streets, highways and street crossings because vehicles are not provided with proper signals. The present invention contemplates the use of signal lights on automobiles to indicate to drivers of vehicles approaching from the front or side as well as from the rear, the intention of the driver of the automobile relative to stopping the machine. Electric signal lights are employed for this purpose, and one is mounted on the forward portion of the car and the other on the rear thereof, as will presently appear.

Each signal light comprises a base or support 17. The base may be hollow to form a recess 18 as shown in Fig. 2 into which the lower end of the lamp socket 19 is adapted to extend. Lamp socket 19 may be, and preferably is, made integral with the top or web portion 20 of the base. The socket 19 is closed at its lower end, and is adapted to extend above the top or web portion 20 of the base. The upper end of the socket 19 is provided with bayonet slots 21 having the usual notches 210 in which the studs 22 on the base 23 of the electric light bulb 24 are adapted to engage in the usual manner.

One of the slots 21 is extended below the top or web portion 20 for the reception of the electric wire or conductor 25 as clearly shown in Fig. 8 of the drawings. The flange 26 of the base may be provided with an opening 27 through which the conductor 25 may extend as shown in Fig. 3; or it may extend into the recess from beneath the base 17 as shown in Fig. 8.

An insulator plug or member 28 is adapted to be inserted in the socket 19 and engages a spring 29 in the bottom of said socket. The insulator member 28 is provided with a longitudinal bore 30 (see Fig. 8) which is arranged axially of said insulator if a central contact bulb be employed as shown on the drawing. A transverse bore 31 is adapted to intercept the bore 30. A binding screw 32 is threaded in said longitudinal bore and is adapted to engage the conductor 25 and hold the same in position in the transverse bore 31. The binding screw 32 constitutes a terminal for the conductor 25. The upper end of the screw 32 is adapted to engage the central contact member or terminal 33 of the electric light bulb 24. The spring 29 is adapted to hold the studs 22 in position in the bayonet slots and at the same time hold the binding screw 32 in electric contact with the terminal 33. The other terminal of the bulb 24 is grounded on the socket 19 in the usual manner.

Suitable means are provided for attaching the base to its support. If the signal light is to be attached to a horizontal surface, such as the running board of an automobile, the top or web portion 20 may be provided with suitable openings 34 (see Fig. 2) through which screws may be inserted for holding the base in proper position. If it is desirable to attach the signal light to license plate or bracket the flange 26 may be provided with downwardly extending lugs 35 through which bolts 36 may extend for holding the lugs 35 in position against the bracket 15.

In this construction the lugs 35 may be attached to the inner side of the flange 26 whereby a seat or ledge 36ª is formed which is adapted to engage the upper edge of the bracket 15 as shown in Fig. 7. The flange 26 may, if desired, be provided with laterally extending arms 37 which are provided with oppositely extending flanges 38 which are adapted to be secured to a vertical member, such as the neck 12ª of the radiator 12 as clearly shown in Fig. 8.

It is necessary to provide means for protecting the bulb 24. A suitable shield or cage 39 is provided for this purpose. The shield 39 is preferably rectangular in cross-section and its sides are provided with the openings 40 through which the light from the bulb may shine. The upper portion of the shield is in the form of a pyramid 41 which is likewise provided with openings 42 in each of its sides. Preferably the shield or cage 39 is made of metal suitably plated. The windows or openings in the sides may be of any suitable shape, those shown being rectangular in the sides and triangular in the sides of the upper or pyramidal portion.

The design or arrangement is such that the device has an ornamental and pleasing appearance. As a result of forming a window in each of the sides of both the upper and lower sections of the shield, an integral skeletonized structure is produced, the framework of which casts shades and shadows in the interior of the shield when the bulb is not illuminated, whereby when the bulb is illuminated the light is distinctive and will immediately attract the attention of drivers of other cars. Furthermore, the windows being oppositely arranged, also adds to the distinctiveness of the signal since the illuminated bulb may be seen between two windows.

A protector 43, preferably of transparent material such as glass, of the desired color, is adapted to be inserted in the cage or shield 39 and to conform to the inner surface thereof. The protector is in the form of a receptacle open at its lower end for the reception of the bulb 24.

The base 17 is provided with an upwardly extending flange 44 (see Figs. 2 and 8) over which the shield 39 is adapted to engage. The flange 44 is arranged inwardly of the sides of the base to form the ledge 45 on which the shield 39 is adapted to seat. The shield is held in position on the base by any suitable means such as the screws 46 which are adapted to engage the upwardly extending lugs 47 on the flange 44.

A spring 48 is interposed between the top or web 20 and the lower end of the protector 43 for resiliently holding the protector in position in the shield. This spring also prevents the parts from rattling and at the same time prevents the screws 46 from becoming loose.

In the use of signal lights on automobiles a red light such as 49 may be mounted at the rear of the machine, as on the bracket 15, and a green light such as 50 may be mounted at the front of the vehicle, as on the neck of the radiator, as shown in Figs. 1 and 8.

Suitable means are provided for automatically flashing the lights when the same are intented to be used as signals. The lights are preferably electric and may be connected in series with a switch such as 52 for closing the circuit, as diagrammatically shown in Fig. 6. Instead of showing the plug or insulator member 28 as being provided with two conductor terminals as in the usual construction, the rear or stop light, for convenience of illustration, is shown as being insulated from the bracket 15 and the portion of the conductor 25 that leads from the rear to the front light is secured to the base or lamp support by the binding screw 250 which will place the two lights in series as indicated by the diagram in Fig. 6. By arranging the two lights in series the operator may tell when the stop light is not functioning. It is understood that the lights may be in either series or multiple and the wiring arranged in any suitable manner, since the details of the wiring constitutes no part of the present invention.

The switch may be operated by any suitable control lever of the automobile such as the brake lever 13. Any suitable type of switch may be employed. The one shown comprises a stationary contact member 53 which is adapted to be engaged by the movable contact member 54 carried by the spring-pressed lever 55. The lever 55 is provided with a lateral extension 56 which is adapted to be engaged by the brake lever 13 for opening the switch when the brake is released. The parts are so arranged that when the brake lever 13 is moved to apply the brakes the spring-pressed lever 55 will close the circuit to cause the lights to become illuminated, whereby the green light at the front of the automobile will indicate to drivers of vehicles approaching from the sides or front, and the red light to drivers of vehicles in the rear, that the brakes are being applied.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, a base having an upwardly extending flange forming a ledge on the upper portion of said base, an electric bulb detachably mounted on said base, a skeletonized shield extending downwardly over said flange and resting on said ledge, fastening means for detachably securing said shield to said flange, a bulb protector nested in said shield and a coiled spring between said base and protector for holding said protector in position and for preventing accidental removal of said holding means.

2. In a signal light, a base, means on said base and extending outwardly therefrom for supporting said light, a socket on said base and adapted to receive an electric light bulb, a skeletonized frame detachably secured to said base, a protector member of diaphanous material within said frame for protecting said bulb, and a spring directly engaging said base and member for supporting said member for holding the same in engagement with said frame.

WILLIAM SCHLIE.